Sept. 5, 1967     C. J. McDOWALL     3,339,405

TORQUE METER

Filed April 22, 1965

INVENTOR.
Charles J. McDowall
BY
Paul Fitzpatrick
ATTORNEY even# United States Patent Office 3,339,405
Patented Sept. 5, 1967

3,339,405
TORQUE METER
Charles J. McDowall, Indianapolis, Ind., assignor to General Motors Corporation, Detroit, Mich., a corporation of Delaware
Filed Apr. 22, 1965, Ser. No. 450,141
4 Claims. (Cl. 73—136)

ABSTRACT OF THE DISCLOSURE

A torque meter for indicating the torque loading on a shaft subject to axial displacement in which the torque is indicated by the relative angular displacement of two arms about a fixed axis. One arm is rotated in response to the torque loading on the shaft and in response to axial displacement of the shaft. The second arm is rotated in response to the axial displacement of the shaft so that a false indication is not given when the shaft shifts axially.

This invention relates generally to a torque responsive device and more specifically to a torque responsive device which utilizes the relative twist (wind-up) between an input or load shaft and a reference shaft as an indication of torque on the load shaft. This torque responsive device utilizes a member splined between the load shaft and the reference shaft in such a manner so as to move axially in response to the relative twist therebetween. This axial movement in turn may be used to actuate a signal or control device. The signal or control device may, however, receive a false signal should the shaft itself move axially for one reason or another. Accordingly, it is the object of this invention to overcome this difficulty and provide a torque responsive device which is responsive only to the torque being transmitted and which will compensate for axial movement of the shaft itself. This object as well as other objects and features of the invention will become apparent to those skilled in the art as the disclosure thereof is made in the following description of a preferred embodiment of the invention as illustrated in the accompanying sheet of drawings wherein:

Figure 1:
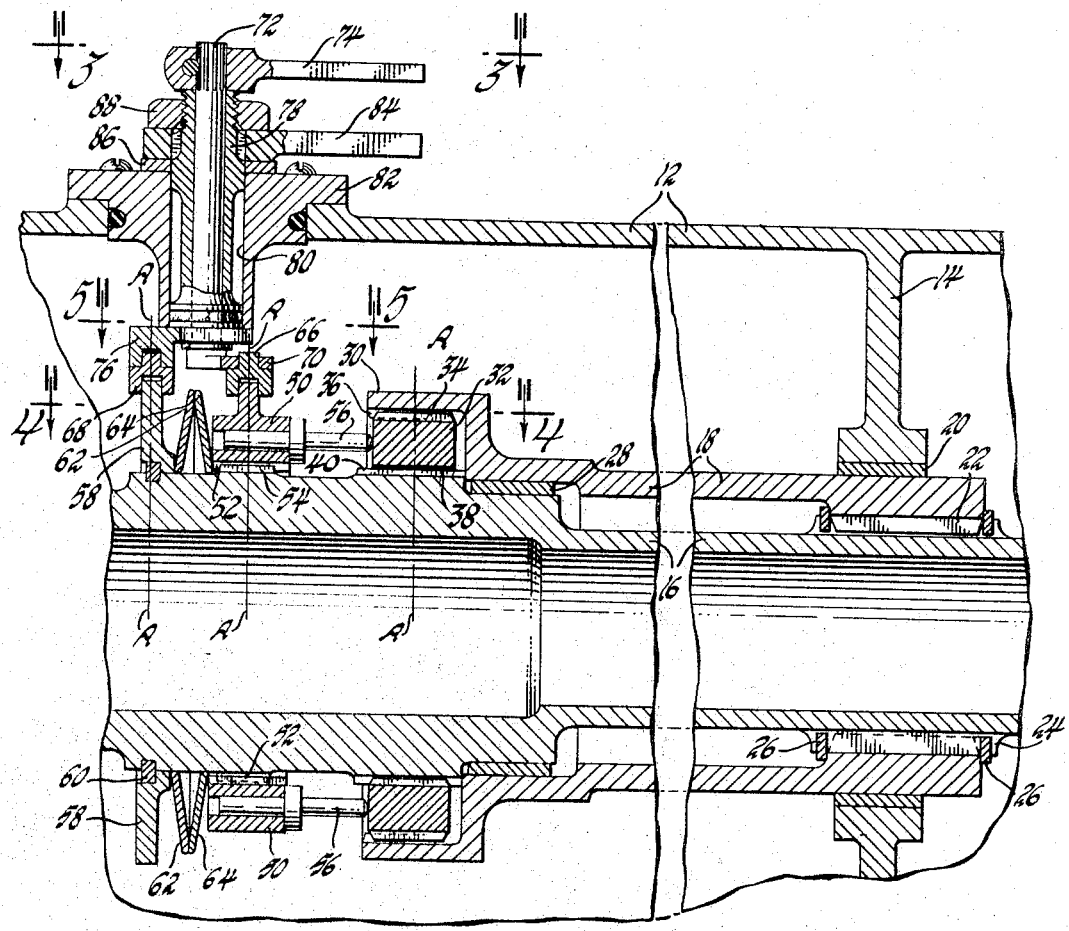
FIGURE 1 is a cross section taken along the longitudinal axis of a power transmitting shaft equipped with a torque responsive device in accordance with the present invention.

Referring now to FIGURE 1, there is shown a housing 12 provided with an apertured web 14 in which is journaled a shaft 18. A load shaft 16 is disposed concentrically within the outer shaft 18 which carries no load and thus acts as a reference shaft. A plain bearing 20 is shown between the outer shaft 18 and the aperture of web 14. However, an anti-friction bearing might equally as well be used. The outer shaft 18 has internal splines 22 adjacent its right end which engage external splines 24 on the inner shaft 16. A pair of snap rings 26 mounted in the external splines 24 straddle the internal splines 22 to couple the shafts 16 and 18 for simultaneous axial movement while the splines engagement 22—24 couples the shaft for simultaneous rotation in the plane of the splines.

Figure 4:
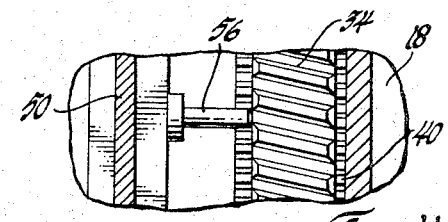
FIGURE 4 is a section taken along the line 4—4 of FIGURE 1 and looking in the direction of the arrows.

A plain bearing 28 is disposed between shaft 18 and the inner shaft 16 to maintain the concentricity of the shafts and provide free rotatability therebetween. The left end of the outer shaft 18 enlarges into an integral cupped portion 30 which provides an annular space between the shaft 18 and the shaft 16. A ring 32 disposed in this axial space is splined to both shafts so that relative twist between the shafts, or wind-up, will cause it to move axially. For example, suppose the splines 34 on the outer circumference of ring 32 are helical with a right hand lead and engage mating splines 36 on the inner circumference of cup 30 such as shown in FIGURE 4. Now if straight splines 38 are provided on the inner circumference of ring 32 to mate with straight external splines 40 on shaft 16, then counterclockwise wind-up of shaft 18 on shaft 16 would cause member 32 to move toward the left in proportion to the torque on the load shaft 16. Obviously the placement of the helical and straight splines could be reversed and other combinations of splines could be used as long as ring 32 is made to move axially in response to wind-up.

The inner shaft 16 extends to the left beyond the cupped portion 30 and has a second set of straight splines 54 spaced from the splines 40. A collar 50 with internal straight splines 52 is slidably mounted on splines 54 and carries a number of push rods 56 which engage the ring 32. Thus as collar 50 rotates with shaft 16, it will move axially in response to axial movement of the ring 32. Spaced to the left of collar 50 is a disc 58 which abuts a stop ring 60 carried by the shaft 16. A pair of Belleville springs 62 and 64 are disposed back to back between the disc 58 and the collar 50. The springs urge the disc 58 into abutment with the stop 60 and the collar 50 and push rods 56 into engagement with the ring 32. The rings of the rotating collar 50 and disc 58 ride in shoes 66 and 68 respectively. The shoe 66 is rotatably mounted in a crank arm 70 extending from the lower end of a rotatably mounted rod 72. The upper end of the rod 72 carries an arm 74. The shoe 68 likewise is rotatably mounted in a crank arm 76 extending from the lower end of a tubular shaft 78 which is telescoped rotatably about rod 72 and is itself rotatably mounted in the bore 80 of a cup 82 secured to the housing 12. The tubular shaft 78 has an arm 84 splined adjacent its upper end between a washer 86 and a nut 88 threaded to its upper end. The arms 74 and 84 are thus coaxially rotatable, with the arm 84 being disposed radially upwardly of the arm 74.

Operation

Figure 3:
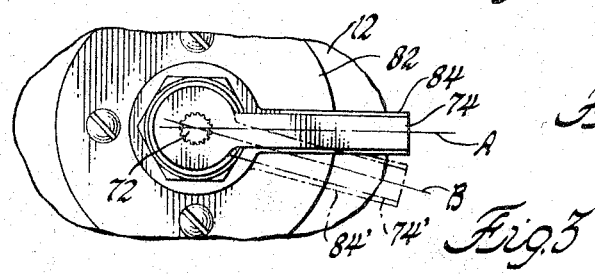
FIGURE 3 is a view taken along the line 3—3 of FIGURE 1 and looking in the direction of the arrows.

In operation, the arm 84 is a rotatable zero reference point while the arm 74 is a rotatable torque indicator. FIGURE 1 shows the position of the various parts when shafts 16 and 18 are rotating with no torque on the load shaft 16. Ring 32, collar 50, and disc 58 are at the axial positions indicated at A. Corresponding to this the arms 74 and 84 will align in the angular position A in FIGURE 3 to indicate zero torque.

Figure 2:
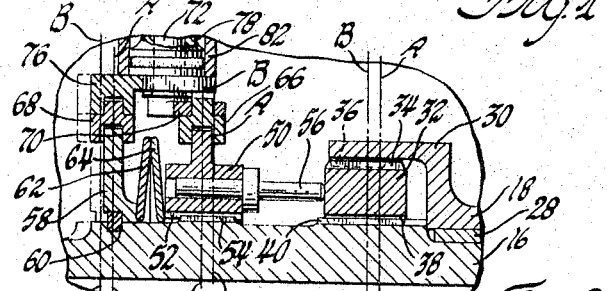
FIGURE 2 is a portion of FIGURE 1 showing details of the torque responsive device.
Figure 5:
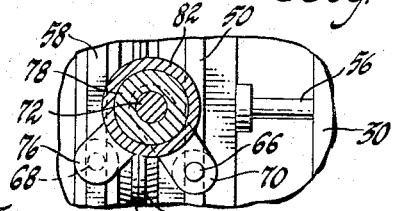
FIGURE 5 is a section taken along the line 5—5 of FIGURE 1 and looking in the direction of the arrows.

A torque load on the inner shaft 16 will cause relative twist or wind-up between it and the reference shaft 18. This relative twist moves the member 32 axially to the left in proportion to the torque load, due to the spline connections between member 32 and the shafts 16 and 18. The axial movement is transmitted to the spinning collar 50 via push rods 56 and both members assume an axial position such as B in FIGURE 2. Axial displacement of the spinning collar 50 in turn causes the shoe 66 to move axially rotating crank 76 and rod 72 clockwise about its axis as can be seen in FIGURE 5. Since arm 74 is connected to rod 72, it rotates to the angular position B in FIGURE 3 where it is shown in phantom and indicated as 74'. Thus the angular displacement between the zero reference arm 84 and the arm 74' is indicative of the torque load.

Should the shafts 16 and 18, however, move axially for some reason, and the member 32 move to position B because of axial movement of the shafts rather than wind-up, this same chain of movement will occur with arm 74' being moved to angular position B. This would yield a false signal except for the fact that the zero reference arm 84 will also rotate an amount equal to that of the arm 74'.

Referring back to FIGURE 2 now suppose that member 32 and collar 50 have been displaced to axial position B due to axial movement of the shafts 16 and 18 rather than because of a torque load on shaft 16. Arm 74 will still rotate to position B in FIGURE 3 where the arm is shown in phantom at 74', however, the zero reference arm 84 will also rotate to position B in FIGURE 3 where the zero reference arm is shown in phantom at 84'. The axial movement of the shafts will thus be accommodated and the torque correctly indicated by the angular displacement between the arms as zero. The rotation of arm 84 caused by the axial movement of the shafts 16 and 18 through spinning disc 58 which moves shoe 68 to rotate crank arm 76, tubular shaft 78, and zero reference arm 84. While the above discussion has referred to the angular displacement between the arms 74 and 84 as indicating torque, it is obvious that the angular displacement could be used for control purposes as well, for instance by placing a control device on one arm and trigger device on the other arm to actuate the control device when the arms are displaced a predetermined amount. Clearly, also, rotation of shaft 78 can be subtracted directly from that of shaft 72 by a differential gear to provide a true or corrected torque output.

Thus, it can be seen that I have provided a torque responsive device which is responsive only to the actual torque being transmitted and will compensate for any false signal generated such as by axial movement of the shaft itself.

It should be understood, of course, that the foregoing disclosure relates only to a preferred embodiment of the invention and that modifications or alterations may be made therein without departing from the spirit and scope of the invention set forth in the appended claims.

I claim:
1. In a torque responsive device having a member operatively connected to concentric load and reference shafts for axial movement in proportion to the relative twist between the load and reference shafts, the improvement comprising:
  a first arm operatively connected to said member, said first arm being angularly displaceable about a fixed axis transverse to the longitudinal axis of said shafts in response to the relative twist between said shafts and in response to the axial movement of said shafts, and
  a zero reference indicator angularly displaceable about said fixed transverse axis in response to axial movement of said shafts whereby said zero arm compensates for axial movement of said shafts so that the angular displacement of said first arm relative to said zero arm is indicative of the relative twist between the shafts.

2. In a torque responsive device having a member operatively connected to concentric load and reference shafts for axial movement in proportion to the relative twist between the load and reference shafts, the improvement comprising:
  a shaft rotatably mounted about an axis transverse to the axis of said load and reference shafts,
  a first arm secured to said shaft,
  a crank spaced from said first arm and extending from said shaft,
  means to rotate said crank in response to relative twist between said reference and load shafts and in response to axial movement of said reference and load shafts,
  a tubular shaft embracing said shaft and rotatable about said transverse axis,
  a zero reference arm secured to said tubular shaft,
  a second crank spaced from said second arm and extending from said tubular shaft, and
  means to rotate said second crank in response to axial movement of said reference and load shafts whereby said zero reference arm compensates for axial movement of said shafts so that the angular displacement of said first arm relative to said zero reference arm is indicative of the relative twist between the shafts.

3. In a torque responsive device having a member operatively connected to a load shaft and a concentric reference shaft for axial movement in proportion to the relative twist between the load and reference shafts, the improvement comprising:
  a collar splined to said load shaft for relative axial movement,
  spring means biasing said collar into engagement with said member,
  a shaft rotatably mounted about an axis transverse to the axis of said load and reference shafts,
  a crank extending from said shaft and engaging said collar so as to be rotatable by axial movement of said collar,
  a first arm secured to said shaft and angularly displaceable therewith in response to relative twist between said reference and load shafts and in response to axial movement of said reference and load shafts,
  a disc mounted on said load shaft spaced from said collar,
  a tubular shaft rotatably mounted about said shaft,
  a second crank extending from said tubular shaft and engaging said disc so as to be rotatable by axial movement of said disc, and
  a zero reference arm secured to said tubular shaft and angularly displaceable therewith in response to axial movement of said reference and load shafts whereby said zero reference arm compensates for axial movement of said shafts so that the angular displacement of said first arm relative to said zero reference arm is indicative of the relative twist between the shafts.

4. In a torque responsive device having a member operatively connected to a load shaft and a concentric reference shaft for axial movement in proportion to the relative twist between the load and reference shafts, the improvement comprising:
  a collar splined to said load shaft for relative axial movement,
  spring means biasing said collar into engagement with said member,
  a shaft rotatably mounted about an axis transverse to the axis of said load and reference shafts,
  a crank extending from said shaft,
  a shoe journaled in the crank spaced from said transverse axis, said shoe engaging said collar,
  a first arm secured to said shaft and angularly displaceable therewith in response to relative twist between said reference and load shafts and in response to axial movement of said reference and load shafts,
  a disc mounted on said load shafts spaced from said collar,
  a tubular shaft rotatably mounted about said shaft, a second crank extending from said tubular shaft,
a second shoe journaled in said second crank spaced from said transverse axis, said second shoe engaging said disc, and
a zero reference arm secured to said tubular shaft and angularly displaceable therewith in response to axial movement of said reference and load shafts whereby said zero reference arm compensates for axial movement of said shafts so that the angular displacement of said first arm relative to said zero reference arm is indicative of the relative twist between the shafts.

References Cited

UNITED STATES PATENTS

| | | | |
|---|---|---|---|
| 496,963 | 5/1893 | Wade et al. | 73—136 |
| 1,204,292 | 11/1916 | McCormick | 73—136 |
| 3,045,479 | 7/1962 | Stein et al. | 73—136 |
| 3,084,540 | 4/1963 | Larkin | 73—136 |

JAMES J. GILL, *Acting Primary Examiner.*

C. A. RUEHL, *Examiner.*